UNITED STATES PATENT OFFICE.

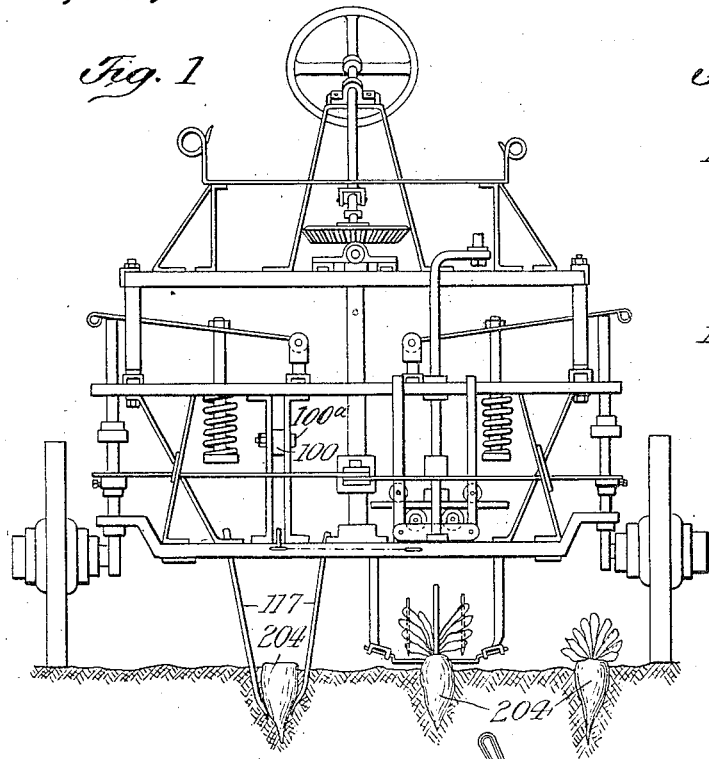
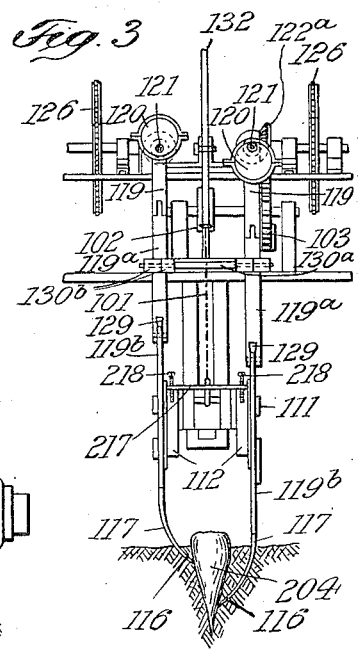
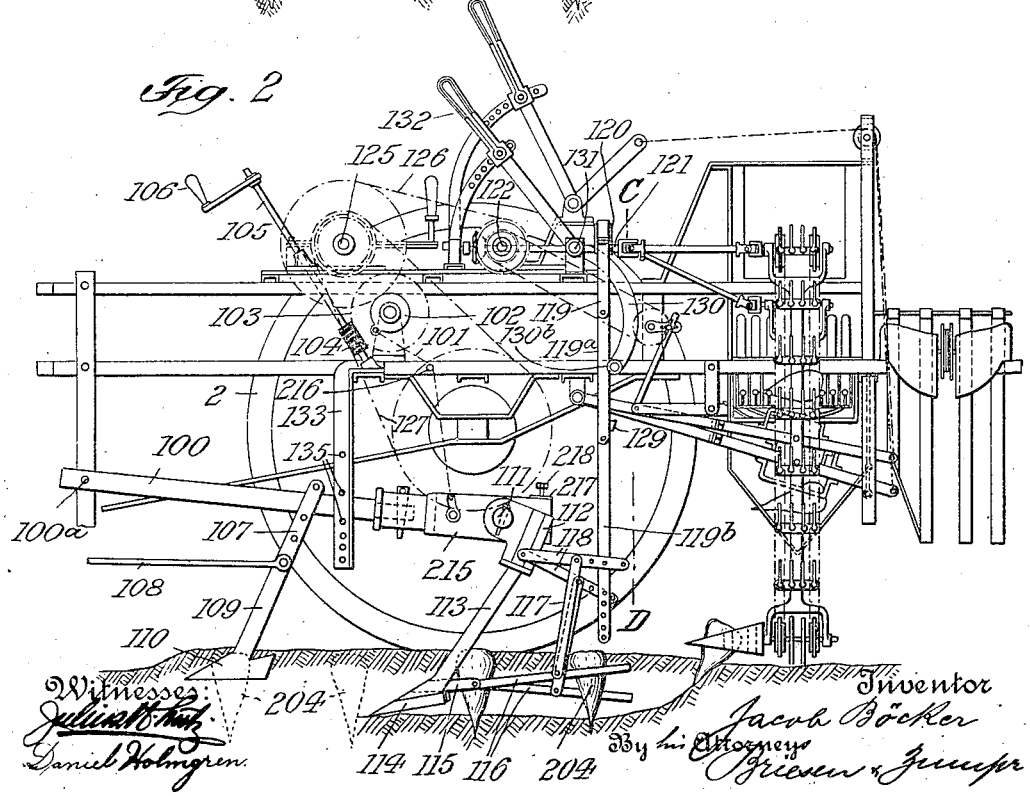

JACOB BOCKER, OF CASTER, NEAR BEDBURG, GERMANY, ASSIGNOR OF ONE-HALF TO THEODOR WASSENBERG, OF ELSEN, NEAR GREVENBROICH, GERMANY.

BEET-HARVESTER.

1,060,968.  Specification of Letters Patent.  Patented May 6, 1913.

Original application filed July 31, 1912, Serial No. 712,456. Divided and this application filed December 10, 1912. Serial No. 735,932.

*To all whom it may concern:*

Be it known that I, JACOB BÖCKER, a citizen of the Empire of Germany, residing at Caster, near Bedburg, Rhenish Prussia, in the Empire of Germany, have invented a new and useful Beet-Harvester, of which the following is a specification.

This invention relates to a beet harvester of novel construction, the present application being a division of a patent application filed by me July 31st, 1912 under Serial No. 712,456. That application embraces a beet harvester for cutting the tops of the beets and separately collecting the tops and the roots, while the present application relates more particularly to means for loosening the soil around the roots and lifting the latter to such a height that they may be readily grasped and withdrawn.

In the accompanying drawing: Figure 1 is a front elevation of a beet harvester embodying my invention; Fig. 2 a side view of part thereof, and Fig. 3 a vertical section on line C—D, Fig. 2.

In the patent application #712,456 above referred to, means are described for cutting the tops off the beets and for then raising the cut-off tops into a receptacle carried by the harvester. Subsequent to this operation, the roots are loosened and slightly lifted, such loosening and lifting means forming the subject matter of the present application and being as follows: A lever 100 (Fig. 2) is mounted in the machine frame to rock at 100ª (Fig. 1) in the vertical plane of the row of beets 204, the tops of which have been cut off. The free end of the lever 100 is guided between two suitable parts 133, 133 of the machine frame and is shown as connected with a head 215, which is suspended from a disk 102 by means of a chain 101 or the like passing over a guiding pulley 216. On the shaft carrying the disk 102 is also fastened a worm wheel 103, which meshes with a worm 104 on an inclined shaft 105 that can be turned by means of a hand-crank 106. In this manner the lever 100 can be lowered and raised, after which it may be secured by means of a pin introduced through any of the holes 135, 135 in the parts 133, 133. On the lever 100 is fastened in any known manner a bow 107 forming a part of a pair of parallel plow arms 109, which latter are pivotally connected with a draw bar 108 extending to the front of the machine frame. The two plow arms 109 are shown as made in one with two plowshares 110 adapted to preliminarily plow the soil on both sides of the row of beets 204, so as not only to loosen the soil, but also to heap up the earth, as is shown in Fig. 2. The two shares 110 may be inclined inward and downward for producing the said effect. Any known means should be employed for varying at will the cross distance between the two plowshares 110, so as to leave a space between their edges slightly larger than the diameter of the beets. The heaping-up of the earth will facilitate the lifting of the beets as will be explained later. The head 215 has fastened in it a pin 111 and carries a bridge 217. On both sides of the head 215 two shoes 112 are mounted to rock on the pin 111 and two adjusting screws 218, 218 are disposed in the bridge 217 for adjusting the two shoes. Two arms 113 are secured to the shoes 112 in any known manner and are provided with plowshares 114 for further loosening and heaping up the soil. By means of the screws 218 and by turning the hand-crank 106 the depth into which the shares 114 are to cut, can be adjusted. Each plow arm 113 has at the lower end a rear arm 115 to which is pivotally connected a lifter 116. The lifter 116 is in turn pivotally connected by means of a bent rod 117 (Fig. 3) with a lever 118 on the upper end of the arm 113.

Two parallel shafts 121, 121 (Fig. 3) are mounted in the machine frame to turn in opposite directions and carry two opposite eccentrics 120, 120, the two straps 119, 119 of which are pivotally connected with the two levers 118, 118 by means of rods 119ª and 119ᵇ. Each rod 119ᵇ has an upper arm 129 bearing against the lower end of the corresponding rod 119ª, whereby the two parts 119ª and 119ᵇ are prevented from bending to the left in Fig. 2. A hand-lever 132 is mounted in the machine frame to rock at 131 and has a lower bent arm 130 with a cross head 130ª, which latter is adapted to bear with two rollers 130ᵇ, 130ᵇ against the rod parts 119ª, 119ª, so that in this manner the three parts 119, 119ª, 119ᵇ are maintained in their normal straight position and are able to positively move the arm 118 and by the rod 117 also the lifter 116. When, however, by pulling the hand-lever 132 downward the two rollers 130$^b$, 130$^b$ are moved away from the rod parts 119$^a$, 119$^a$, then the parts 119$^a$, 119$^b$ of each rod can bend to the right in Fig. 2 for permitting the lever 100 with all parts connected therewith to be raised by turning the hand-crank 106 in the respective direction and thus the plowshares 110, 114 can be withdrawn from the soil and kept suspended during the drive or during turning. As the two eccentrics 120, 120 are placed oppositely, the two lifters 116, 116 will reciprocate in opposite directions, so as to alternately push the beet 204 from opposite sides for effectively loosening the beet and facilitating its ascent. The two lifters 116, 116 are rods of triangular cross section, so as to enable them to better cut downward into the soil and to strike the beet 204 from below instead of sliding on it. Preferably the two lifters 116, 116 are made to converge rearward, so that also the smallest beets can be certainly seized and lifted. Each time that the beet 204 is knocked upward the loosened soil will fill up the space left by the beet, so that the beet is prevented from sinking and is obliged to gradually rise from the soil, as is shown in Fig. 2. The levers 118 are provided with several holes and also the lower ends of the rod parts 119$^b$, 119$^b$ so as to be able to adjust the several parts in their relative position. The above mentioned shafts 121 are driven in suitable manner, say from the right rear wheel 2 by means of a chain gear 127, a shaft 125, chain gears 126, shafts 122, and bevel wheels 122$^a$.

It will be seen that the soil is first loosened at both sides of a row of beets by the plow shares and that then the beets are slightly raised by the lifters, so as to facilitate their subsequent withdrawal from the ground.

I claim:

1. In a beet-harvester, the combination with a frame, of two plowshares in said frame adapted to loosen the soil on both sides of a row of beets, two bars pivotally connected with said two plowshares and adapted to vertically reciprocate in the soil behind the shares, and means for rocking said two bars in opposite directions so as to repeatedly push the beet from both sides in alternating directions for loosening and gradually lifting it.

2. In a beet-harvester, the combination with a frame, of two front plowshares in said frame adapted to preliminarily loosen the soil on both sides of a row of beets and to heap up the earth in this row, two rear plowshares in said frame adapted to plow the soil for further loosening and heaping it up, two bars pivotally connected with said two rear plowshares and converging rearward, and means for rocking said two bars in opposite directions so as to repeatedly push the beet from both sides in alternating directions for loosening and gradually lifting it, the loosened and heaped-up earth filling up the space left by the beet.

3. In a beet-harvester, plow shares for loosening the soil at both sides of a row of beets, beet-lifting members pivoted to said plow shares, and means for rocking said members.

JACOB BÖCKER.

Witnesses:
D. van Husen,
M. Kneppers.